(12) United States Patent
Yim et al.

(10) Patent No.: US 11,272,138 B2
(45) Date of Patent: Mar. 8, 2022

(54) DISPLAY DEVICE PERFORMING MULTIPLE INPUT MULTIPLE OUTPUT COMMUNICATION, AND COMMUNICATION SYSTEM

(71) Applicant: Samsung Display Co., Ltd., Yongin-Si (KR)

(72) Inventors: Dale Yim, Yongin-si (KR); Hosuk Maeng, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/828,829

(22) Filed: Mar. 24, 2020

(65) Prior Publication Data

US 2021/0058583 A1 Feb. 25, 2021

(30) Foreign Application Priority Data

Aug. 21, 2019 (KR) .................... 10-2019-0102085

(51) Int. Cl.
*H04N 7/12* (2006.01)
*H04N 5/40* (2006.01)
*H04N 5/455* (2006.01)

(52) U.S. Cl.
CPC ............... *H04N 7/12* (2013.01); *H04N 5/40* (2013.01); *H04N 5/455* (2013.01)

(58) Field of Classification Search
CPC ............. H04N 7/12; H04N 5/40; H04N 5/455
See application file for complete search history.

(56) References Cited

U.S. PATENT DOCUMENTS

| | | | | |
|---|---|---|---|---|
| 6,535,239 B1* | 3/2003 | Kim | ................ | H04N 7/141 348/14.02 |
| 9,553,640 B1* | 1/2017 | Chandra | .............. | H04B 7/0413 |
| 2010/0195754 A1* | 8/2010 | Li | ................ | H04B 7/0805 375/267 |
| 2011/0116438 A1* | 5/2011 | Tsunekawa | .............. | H04L 5/06 370/312 |
| 2012/0033718 A1* | 2/2012 | Kauffman | ............ | H04B 1/3822 375/222 |
| 2015/0071140 A1* | 3/2015 | Tarighat Mehrabani | | ................ H04W 52/0235 370/311 |
| 2016/0360489 A1* | 12/2016 | Boodannavar | .... | H04W 52/0261 |
| 2020/0045206 A1 | 2/2020 | Yim et al. | | |

* cited by examiner

*Primary Examiner* — Michael E Teitelbaum
(74) *Attorney, Agent, or Firm* — Innovation Counsel LLP

(57) ABSTRACT

A display device may include a display panel, N receiving antennas integrated with the display panel, where N is an integer greater than 2, a communication module, and a display driver. The communication module receives a video communication signal using a subset of receiving antennas of the N receiving antennas and an audio communication signal using at least one receiving antenna of the N receiving antennas that is different from the subset of receiving antennas and generates original video data based on the video communication signal and audio data based on the audio communication signal. The display driver receives the original video data from the communication module and drives the display panel based on the original video data.

18 Claims, 12 Drawing Sheets

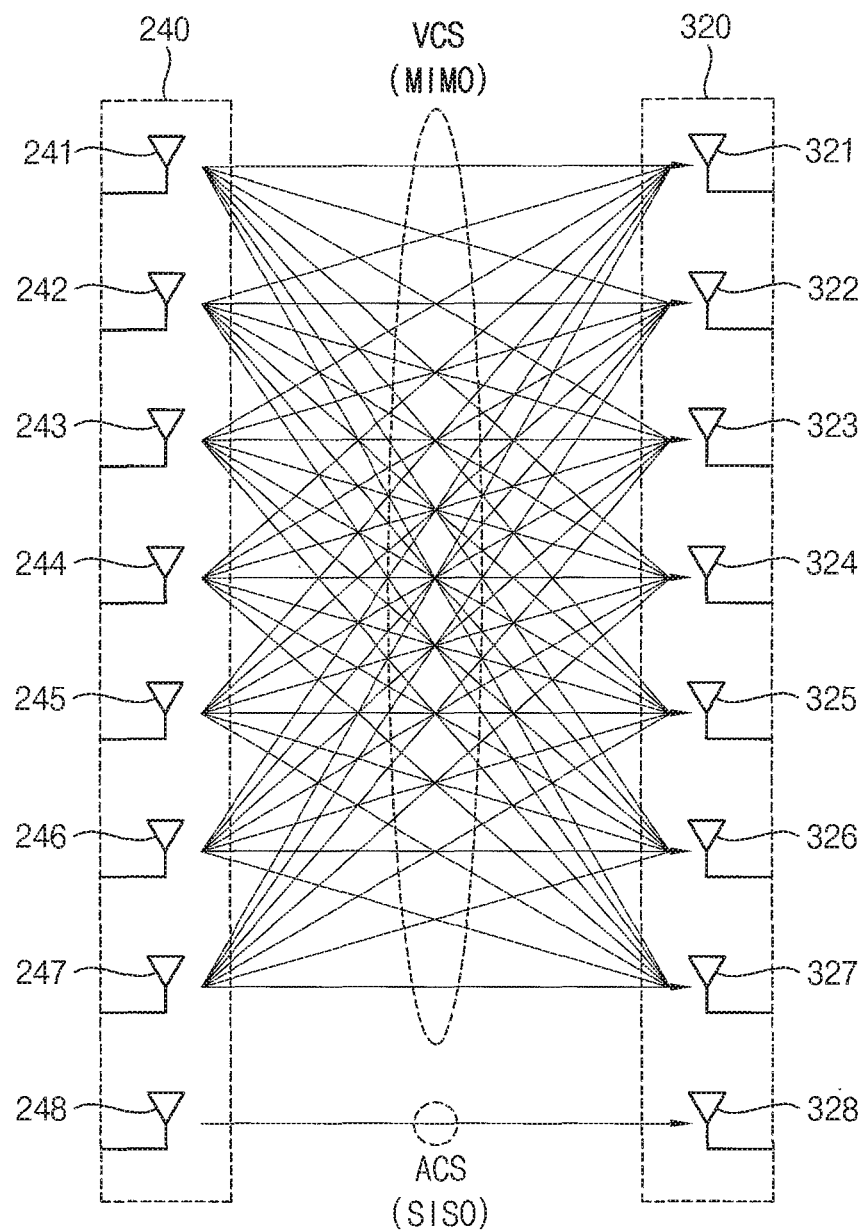

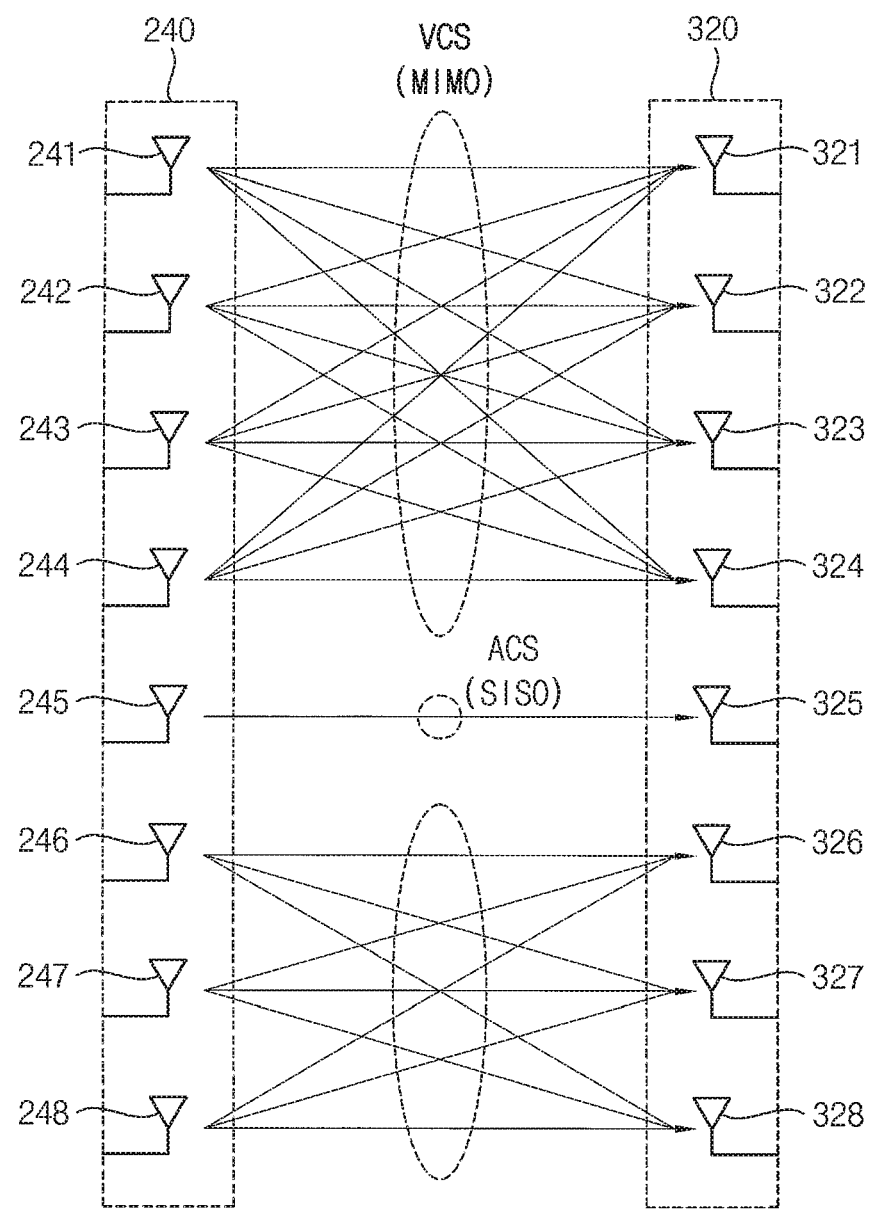

FIG. 3

|  | | 241 | 242 | 243 | 244 | 245 | 246 | 247 |
|--|--|-----|-----|-----|-----|-----|-----|-----|
|  | | \multicolumn{7}{c}{SPACE} | | | | | | |

| | | 241 | 242 | 243 | 244 | 245 | 246 | 247 |
|---|---|---|---|---|---|---|---|---|
| | UT1 | x1 | x2 | x3 | x4 | x5 | x6 | x7 |
| | UT2 | −x2 | x1 | x4 | −x3 | x6 | −x5 | 0 |
| | UT3 | −x3 | −x4 | x1 | x2 | x7 | 0 | −x5 |
| | UT4 | −x4 | x3 | −x2 | x1 | 0 | −x7 | x6 |
| | UT5 | −x5 | −x6 | −x7 | 0 | x1 | x2 | x3 |
| | UT6 | −x6 | x5 | 0 | x7 | −x2 | x1 | −x4 |
| | UT7 | −x7 | 0 | x5 | −x6 | −x3 | x4 | x1 |
| | UT8 | 0 | −x7 | x6 | x5 | −x4 | −x3 | x2 |
| TIME | UT9 | x1* | x2* | x3* | x4* | x5* | x6* | x7* |
| | UT10 | −x2* | x1* | x4* | −x3* | x6* | −x5* | 0 |
| | UT11 | −x3* | −x4* | x1* | x2* | x7* | 0 | −x5* |
| | UT12 | −x4* | x3* | −x2* | x1 | 0 | −x7* | x6* |
| | UT13 | −x5* | −x6* | −x7* | 0 | x1* | x2* | x3* |
| | UT14 | −x6* | x5* | 0 | x7* | −x2* | x1* | −x4* |
| | UT15 | −x7* | 0 | x5* | −x6* | −x3* | x4* | x1* |
| | UT16 | 0 | −x7* | x6* | x5* | −x4* | −x3* | x2* |

$$\begin{bmatrix} y_1 \\ y_2 \\ y_3 \\ y_4 \\ y_5 \\ y_6 \\ y_7 \\ y_8 \\ y_1^* \\ y_2^* \\ y_3^* \\ y_4^* \\ y_5^* \\ y_6^* \\ y_7^* \\ y_8^* \end{bmatrix} = \begin{bmatrix} h_{11} & h_{12} & h_{13} & h_{14} & h_{15} & h_{16} & h_{17} \\ h_{22} & -h_{21} & h_{24} & -h_{23} & -h_{26} & h_{25} & 0 \\ h_{33} & h_{34} & -h_{31} & -h_{32} & -h_{37} & 0 & h_{35} \\ h_{44} & -h_{43} & h_{42} & -h_{41} & 0 & h_{47} & -h_{46} \\ h_{55} & h_{56} & h_{57} & 0 & -h_{51} & -h_{52} & -h_{53} \\ h_{66} & -h_{65} & 0 & -h_{67} & h_{62} & -h_{61} & h_{64} \\ h_{77} & 0 & -h_{75} & h_{76} & h_{73} & -h_{74} & -h_{71} \\ 0 & h_{87} & -h_{86} & -h_{85} & h_{84} & h_{83} & -h_{82} \\ h_{11}^* & h_{12}^* & h_{13}^* & h_{14}^* & h_{15}^* & h_{16}^* & h_{17}^* \\ h_{22}^* & -h_{21}^* & h_{24}^* & -h_{23}^* & -h_{26}^* & h_{25}^* & 0 \\ h_{33}^* & h_{34}^* & -h_{31}^* & -h_{32}^* & -h_{37}^* & 0 & h_{35}^* \\ h_{44}^* & -h_{43}^* & h_{42}^* & -h_{41}^* & 0 & h_{47}^* & -h_{46}^* \\ h_{55}^* & h_{56}^* & h_{57}^* & 0 & -h_{51}^* & -h_{52}^* & -h_{53}^* \\ h_{66}^* & -h_{65}^* & 0 & -h_{67}^* & h_{62}^* & -h_{61}^* & h_{64}^* \\ h_{77}^* & 0 & -h_{75}^* & h_{76}^* & h_{73}^* & -h_{74}^* & -h_{71}^* \\ 0 & h_{87}^* & -h_{86}^* & -h_{85}^* & h_{84}^* & h_{83}^* & -h_{82}^* \end{bmatrix} \begin{bmatrix} x_1 \\ x_2 \\ x_3 \\ x_4 \\ x_5 \\ x_6 \\ x_7 \end{bmatrix} + \begin{bmatrix} n_1 \\ n_2 \\ n_3 \\ n_4 \\ n_5 \\ n_6 \\ n_7 \\ n_8 \\ n_1^* \\ n_2^* \\ n_3^* \\ n_4^* \\ n_5^* \\ n_6^* \\ n_7^* \\ n_8^* \end{bmatrix}$$

DISPLAY DEVICE PERFORMING MULTIPLE INPUT MULTIPLE OUTPUT COMMUNICATION, AND COMMUNICATION SYSTEM

CROSS-REFERENCE TO RELATED APPLICATION(S)

This application claims priority under 35 USC § 119 to Korean Patent Applications No. 10-2019-0102085, filed on Aug. 21, 2019 in the Korean Intellectual Property Office (KIPO), the disclosure of which is incorporated herein by reference in its entirety.

BACKGROUND

1. Technical Field

Example embodiments of the present disclosure relate generally to display devices. More particularly, example embodiments relate to display devices performing multiple input multiple output (MIMO) communication, and communication systems including such the display devices.

2. Description of the Related Art

To increase a data transfer capacity, a multiple input multiple output (MIMO) communication technique is widely used in various communication systems. In a MIMO communication system, a transmitting terminal or a base station may transmit a communication signal using multiple transmitting antennas, and a receiving terminal or a user equipment receives the communication signal using multiple receiving antennas.

However, in a conventional communication system, an audio communication signal may be transferred through one of MIMO communication channels that is used to transfer a video communication signal.

SUMMARY

Some example embodiments of the present disclosure provide a display device that efficiently receives a video communication signal and an audio communication signal through separate communication channels based on data transfer capacity and latency.

Some example embodiments provide a communication system that efficiently transmits and receives a video communication signal and an audio communication signal.

According to some example embodiments, a display device includes a display panel, N receiving antennas integrated with the display panel, where N is an integer greater than 2, a communication module that receives a video communication signal using a subset of receiving antennas of the N receiving antennas and an audio communication signal using at least one receiving antenna of the N receiving antennas that is different from the subset of receiving antennas and generates original video data based on the video communication signal and audio data based on the audio communication signal, and a display driver that receives the original video data from the communication module and drives the display panel based on the original video data.

In example embodiments, the display device may include, as the N receiving antennas, eight receiving antennas. The communication module may receive the video communication signal by performing 7*7 multiple input multiple output (MIMO) communication using seven of the eight receiving antennas and the audio communication signal by performing single input single output (SISO) communication using a remaining one of the eight receiving antennas.

In example embodiments, the communication module may generate the original video data by performing temporal-spatio code (TSC) decoding on received video data corresponding to the video communication signal that is received using the subset of receiving antennas.

In example embodiments, the communication module may perform the TSC decoding on the received video data using an equation, "$X=(H^H H)^{-1} H^H Y$", where X may be an original video data matrix representing the original video data, Y may be a received video data matrix representing the received video data, H may be a channel matrix of the video communication signal, and $H^H$ may be a Hermitian matrix of the channel matrix.

In example embodiments, the video communication signal may be transmitted by seven transmitting antennas of a base station, and the channel matrix may be, $$\begin{bmatrix} h11 & h12 & h13 & h14 & h15 & h16 & h17 \\ h22 & -h21 & h24 & -h23 & -h26 & h25 & 0 \\ h33 & h34 & -h31 & -h32 & -h37 & 0 & h35 \\ h44 & -h43 & h42 & -h41 & 0 & h47 & -h46 \\ h55 & h56 & h57 & 0 & -h51 & -h52 & -h53 \\ h66 & -h65 & 0 & -h67 & h62 & -h61 & h64 \\ h77 & 0 & -h75 & h76 & h73 & -h74 & -h71 \\ 0 & h87 & -h86 & -h85 & h84 & h83 & -h82 \\ h11^* & h12^* & h13^* & h14^* & h15^* & h16^* & h17^* \\ h22^* & -h21^* & h24^* & -h23^* & -h26^* & h25^* & 0 \\ h33^* & h34^* & -h31^* & -h32^* & -h37^* & 0 & h35^* \\ h44^* & -h43^* & h42^* & -h41^* & 0 & h47^* & -h46^* \\ h55^* & h56^* & h57^* & 0 & -h51^* & -h52^* & -h53^* \\ h66^* & -h65^* & 0 & -h67^* & h62^* & -h61^* & h64^* \\ h77^* & 0 & -h75^* & h76^* & h73^* & -h74^* & -h71^* \\ 0 & h87^* & -h86^* & -h85^* & h84^* & h83^* & -h82^* \end{bmatrix},$$

where hij may be a channel coefficient for the video communication signal transmitted by a j-th one of the seven transmitting antennas in an i-th unit time, hij* may be a conjugate of the hij, i may be an integer greater than or equal to 1 and smaller than or equal to 8, and j may be an integer greater than or equal to 1 and smaller than or equal to 7.

In example embodiments, the at least one receiving antenna for receiving the audio communication signal may be selected from the N receiving antennas based on fading values of a plurality of communication channels corresponding to the N receiving antennas.

In example embodiments, the at least one receiving antenna for receiving the audio communication signal may be selected such that a communication channel corresponding to the at least one receiving antenna among the plurality of communication channels has a maximum fading value among the fading values.

In example embodiments, the communication module may include a receiver that receives the video communication signal using the subset of receiving antennas and the audio communication signal using the at least one receiving antenna, and generates received video data by performing analog-to-digital conversion on the video communication signal and the audio data by performing analog-to-digital conversion on the audio communication signal, and a TSC decoder that generates the original video data by performing TSC decoding on the received video data.

In example embodiments, the audio data may be provided to a speaker through the display driver.

In example embodiments, the display driver may include a data driver that provides data signals to a plurality of pixels based on the original video data, a gate driver that provides gate signals to the plurality of pixels, and a controller that controls the data driver and the gate driver.

According to some example embodiments, a communication device includes a base station including N transmitting antennas, where N is an integer greater than 2, wherein the base station transmits transmit a video communication signal using a subset of transmitting antennas of the N transmitting antennas and an audio communication signal using at least one transmitting antenna of the N transmitting antennas, and a user equipment including N receiving antennas and a display panel, wherein the user equipment receives the video communication signal using a subset of receiving antennas of the N receiving antennas and the audio communication signal using at least one receiving antenna of the N receiving antennas, and drives the display panel based on the video communication signal.

In example embodiments, the base station may include, as the N transmitting antennas, eight transmitting antennas, the user equipment may include, as the N receiving antennas, eight receiving antennas, the video communication signal may be transferred through 7*7 multiple input multiple output (MIMO) communication channels between seven of the eight transmitting antennas and seven of the eight receiving antennas, and the audio communication signal may be transferred through a single input single output (SISO) communication channel between a remaining one of the eight transmitting antennas and a remaining one of the eight receiving antennas.

In example embodiments, the N receiving antennas may be integrated with the display panel.

In example embodiments, the user equipment may further include a display device having the display panel, and the N receiving antennas may be disposed outside the display device.

In example embodiments, the base station may further include a temporal-spatio code (TSC) encoder that generates transmitted video data by performing TSC encoding on original video data, and a transmitter that generates the video communication signal by performing digital-to-analog conversion on the transmitted video data and the audio communication signal by performing digital-to-analog conversion on audio data, transmits the video communication signal using the subset of transmitting antennas and the audio communication signal using the at least one transmitting antenna.

In example embodiments, a TSC used in the TSC encoding may be, $$\begin{bmatrix} x1 & x2 & x3 & x4 & x5 & x6 & x7 \\ -x2 & x1 & x4 & -x3 & x6 & -x5 & 0 \\ -x3 & -x4 & x1 & x2 & x7 & 0 & -x5 \\ -x4 & x3 & -x2 & x1 & 0 & -x7 & x6 \\ -x5 & -x6 & -x7 & 0 & x1 & x2 & x3 \\ -x6 & x5 & 0 & x7 & -x2 & x1 & -x4 \\ -x7 & 0 & x5 & -x6 & -x3 & x4 & x1 \\ 0 & -x7 & x6 & x5 & -x4 & -x3 & x2 \\ x1^* & x2^* & x3^* & x4^* & x5^* & x6^* & x7^* \\ -x2^* & x1^* & x4^* & -x3^* & x6^* & -x5^* & 0 \\ -x3^* & -x4^* & x1^* & x2^* & x7^* & 0 & -x5^* \\ -x4^* & x3^* & -x2^* & x1^* & 0 & -x7^* & x6^* \\ -x5^* & -x6^* & -x7^* & 0 & x1^* & x2^* & x3^* \\ -x6^* & x5^* & 0 & x7^* & -x2^* & x1^* & -x4^* \\ -x7^* & 0 & x5^* & -x6^* & -x3^* & x4^* & x1^* \\ 0 & -x7^* & x6^* & x5^* & -x4^* & -x3^* & x2^* \end{bmatrix},$$

where data values x1 through x7 may be first through seventh data values included in the original video data, and data values x1* through x7* may be conjugates of the data values x1 through x7.

In example embodiments, the user equipment may further include a receiver that receives the video communication signal using the subset of receiving antennas and the audio communication signal using the at least one receiving antenna, and generates received video data by performing analog-to-digital conversion on the video communication signal and audio data by performing analog-to-digital conversion on the audio communication signal, and a TSC decoder that generates original video data by performing TSC decoding on the received video data.

In example embodiments, the TSC decoder may perform the TSC decoding on the received video data using an equation, "X=(H$^H$H)$^{-1}$ H$^H$ Y", where X may be an original video data matrix representing the original video data, Y may be a received video data matrix representing the received video data, H may be a channel matrix of the video communication signal, and H$^H$ may be a Hermitian matrix of the channel matrix.

In example embodiments, the video communication signal may be transmitted by seven transmitting antennas of the base station, and the channel matrix may be, $$\begin{bmatrix} h11 & h12 & h13 & h14 & h15 & h16 & h17 \\ h22 & -h21 & h24 & -h23 & -h26 & h25 & 0 \\ h33 & h34 & -h31 & -h32 & -h37 & 0 & h35 \\ h44 & -h43 & h42 & -h41 & 0 & h47 & -h46 \\ h55 & h56 & h57 & 0 & -h51 & -h52 & -h53 \\ h66 & -h65 & 0 & -h67 & h62 & -h61 & h64 \\ h77 & 0 & -h75 & h76 & h73 & -h74 & -h71 \\ 0 & h87 & -h86 & -h85 & h84 & h83 & -h82 \\ h11^* & h12^* & h13^* & h14^* & h15^* & h16^* & h17^* \\ h22^* & -h21^* & h24^* & -h23^* & -h26^* & h25^* & 0 \\ h33^* & h34^* & -h31^* & -h32^* & -h37^* & 0 & h35^* \\ h44^* & -h43^* & h42^* & -h41^* & 0 & h47^* & -h46^* \\ h55^* & h56^* & h57^* & 0 & -h51^* & -h52^* & -h53^* \\ h66^* & -h65^* & 0 & -h67^* & h62^* & -h61^* & h64^* \\ h77^* & 0 & -h75^* & h76^* & h73^* & -h74^* & -h71^* \\ 0 & h87^* & -h86^* & -h85^* & h84^* & h83^* & -h82^* \end{bmatrix},$$

where hij may be a channel coefficient for the video communication signal transmitted by a j-th one of the seven transmitting antennas in an i-th unit time, hij* may be a conjugate of the hij, i may be an integer greater than or equal to 1 and smaller than or equal to 8, and j may be an integer greater than or equal to 1 and smaller than or equal to 7.

In example embodiments, the at least one transmitting antenna for transmitting the audio communication signal may be selected from the N transmitting antennas based on fading values of a plurality of communication channels corresponding to the N transmitting antennas, and the at least one receiving antenna may be coupled to the transmitting antenna that is selected from the N receiving antennas.

According to some embodiments, a display device and a communication system according to example embodiments may receive a video communication signal through multiple input multiple output (MIMO) communication using a subset of receiving antennas of N receiving antennas and receive an audio communication signal through single input single output (SISO) communication using at least one receiving antenna of the N receiving antennas that is different from the subset of receiving antennas. Accordingly, the video communication signal may be received at a high data transfer rate, and the audio communication signal may be received with a short latency.

BRIEF DESCRIPTION OF THE DRAWINGS

Illustrative, non-limiting example embodiments disclosed herein will be more clearly understood from the following detailed description taken in conjunction with the accompanying drawings.

FIG. 2A, FIG. 2B, FIG. 2C, and FIG. 2D are diagrams illustrating examples where a communication channel for transferring (or transmitting and receiving) an audio communication signal is selected in a communication system according to example embodiments.

FIG. 3 is a diagram illustrating an example of a temporal-spatio code (TSC) used in TSC encoding performed by a base station in a communication system according to an example embodiment.

FIG. 7 is a diagram for describing an example of a received video data matrix in a display device according to an example embodiment.

DESCRIPTION OF EMBODIMENTS

Figure 1:
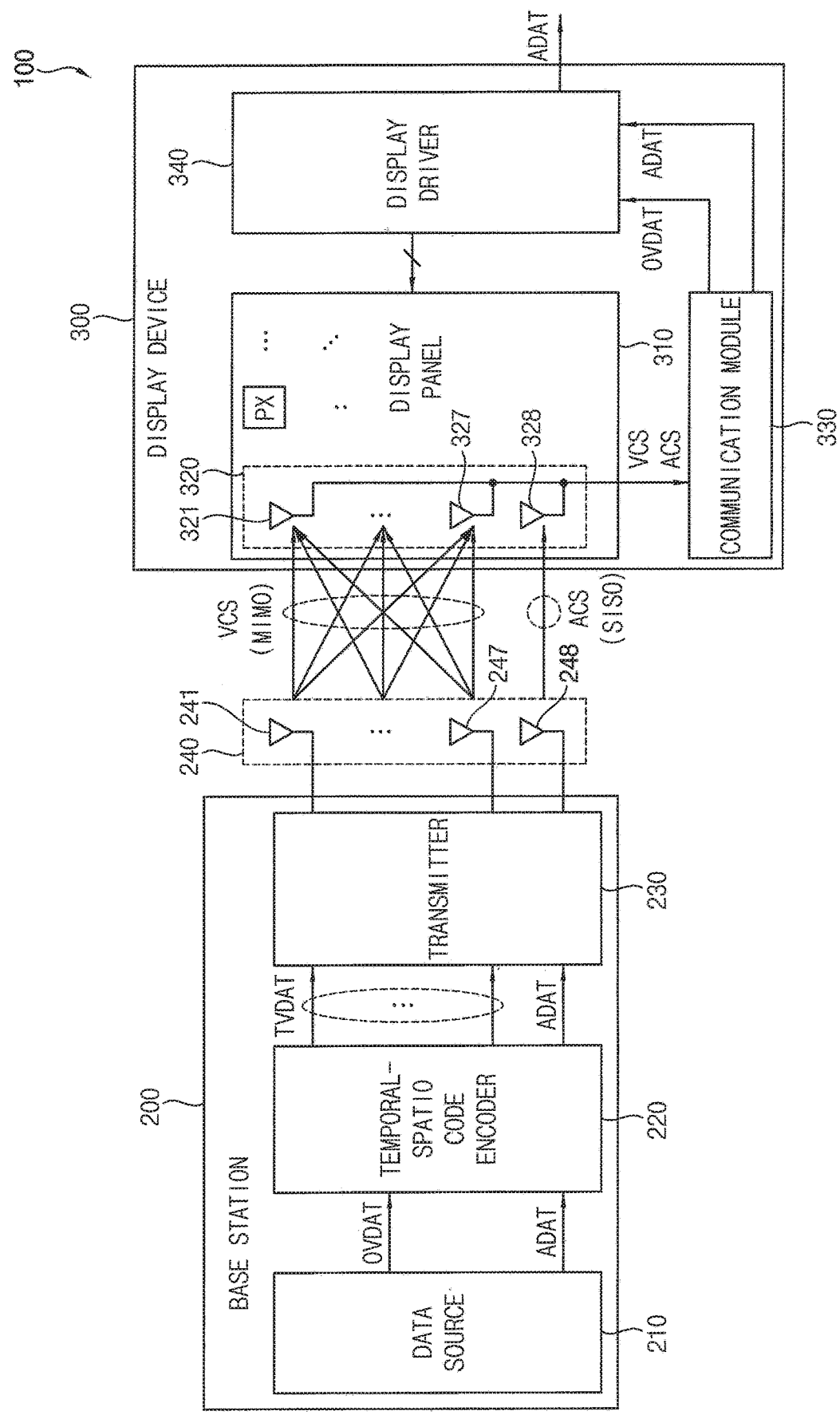
FIG. 1 is a block diagram illustrating a communication system according to an example embodiment.

The example embodiments of the present disclosure are described more fully hereinafter with reference to the accompanying drawings. Like or similar reference numerals refer to like or similar elements throughout the present disclosure.

FIG. 1 is a block diagram illustrating a communication system according to an example embodiment, FIG. 2A, FIG. 2B, FIG. 2C, and FIG. 2D are diagrams illustrating examples where a communication channel for transferring (or transmitting and receiving) an audio communication signal is selected in a communication system according to example embodiments, and FIG. 3 is a diagram illustrating an example of a temporal-spatio code (TSC) used in TSC encoding performed by a base station in a communication system according to an example embodiment.

Referring to FIG. 1, a communication system 100 may include a base station 200 that transmits a video communication signal VCS and an audio communication signal ACS, and a display device 300 (or a user equipment (UE)) that receives the video communication signal VCS and the audio communication signal ACS.

The base station 200 may include N transmitting antennas 240, where N is an integer greater than two. The base station 200 may transmit the video communication signal VCS using N−1 transmitting antennas (e.g., transmitting antennas 241, ..., 247) of the N transmitting antennas 240, and may transmit the audio communication signal ACS using one of the N transmitting antennas 240 (e.g., transmitting antenna 248). The display device 300 may include N receiving antennas 320. According to some embodiments, the number of antennas included in the display device 300 may be different from N. The display device 300 may receive the video communication signal VCS for multiple input multiple output (MIMO) communication with the base station 200 using N−1 receiving antennas 321, ..., 327 of the N receiving antennas 320 that are coupled with the N−1 transmitting antennas 241, ..., 247 of the base station 200 and may further receive the audio communication signal ACS for single input single output (SISO) communication with the base station 200 using the receiving antenna 328 of the N receiving antennas 320 that are coupled with the transmitting antenna 248 of the base station 200. Thus, in the communication system 100, the video communication signal VCS may be transferred (or transmitted and received) through (N−1)*(N−1) MIMO communication, and the audio communication signal ACS may be transferred (or transmitted and received) through 1*1 SISO communication between the base station 200 and the display device 300. The display device 300 may include a display panel 310 and may drive the display panel 310 based on the received video communication signal VCS.

As a non-limiting example embodiment, the base station 200 may include, as the N transmitting antennas 240, eight transmitting antennas 241, ..., 247 and 248, and the display device (or the user equipment) 300 may include, as the N receiving antennas 320, eight receiving antennas 321, ..., 327, and 328. In this case, the video communication signal VCS may be transferred through 7*7 MIMO communication between the seven transmitting antennas 241, ..., 247 and the seven receiving antennas 321, ..., 327, and the audio communication signal ACS may be transferred through the SISO communication by the transmitting antenna 248 and the receiving antenna 328.

In a conventional MIMO communication system, the video communication signal VCS and the audio communication signal ACS, or a single communication signal representing both video data and audio data may be transferred through the same MIMO communication. That is, in the conventional MIMO communication system, the video communication signal VCS and the audio communication signal ACS are not transferred through separated communications. However, in the communication system 100, the video communication signal VCS may be transferred through the (N−1)*(N−1) MIMO communication, for example the 7*7 MIMO communication, and the audio communication signal ACS may be transferred through the SISO communication. Because the video communication signal VCS and the audio communication signal ACS may be transferred through different communications, the video communication signal VCS may be transferred at a data transfer rate (or a data transfer speed) different from that of the audio communication signal ACS. In some embodiments, the data transfer rate of the video communication signal VCS is higher than that of the audio communication signal ACS. Further, in some example embodiments, the audio communication signal ACS may be transferred through the SISO communication without encoding and decoding. Thus, the audio communication signal ACS may be transferred with a latency shorter than that of the video communication signal VCS. Therefore, the communication system 100 may perform the MIMO communication suitable for the video communication signal VCS and the SISO communication suitable for the audio communication signal ACS.

In some example embodiments, a communication channel for transferring (or transmitting and receiving) the audio communication signal ACS may be selected from a plurality of communication channels based on fading values of the plurality of communication channels. Here, each fading value may be a value representing an attenuation degree (or a fading level) of a signal in a corresponding communication channel. In some example embodiments, a communication channel having the maximum fading value among the plurality of communication channels may be selected as the communication channel for transferring the audio communication signal ACS. For example, the base station 200 may select a transmitting antenna (e.g., the transmitting antenna 248) that corresponds (or is coupled) to the communication channel having the maximum fading value as the transmitting antenna for transmitting the audio communication signal ACS among the N transmitting antennas 240. In the display device 300, a receiving antenna (e.g., the receiving antenna 328) that is coupled to the selected transmitting antenna 248 of the base station 200 may serve as the receiving antenna for receiving the audio communication signal ACS among the N receiving antennas 320 of the display device 300. That is, the receiving antenna 328 for receiving the audio communication signal ACS may be selected among the N receiving antennas 320 such that a communication channel that corresponds (or is coupled) to the receiving antenna 328 among the plurality of communication channels has the maximum fading value among the fading values of the plurality of communication channels. Accordingly, the communication channel for transferring the audio communication signal ACS may be dynamically (e.g., in real time) changed to the communication channel that has the maximum fading value among the plurality of communication channels, or the communication channel that has the maximum signal attenuation degree among the plurality of communication channels.

Figure 2B:
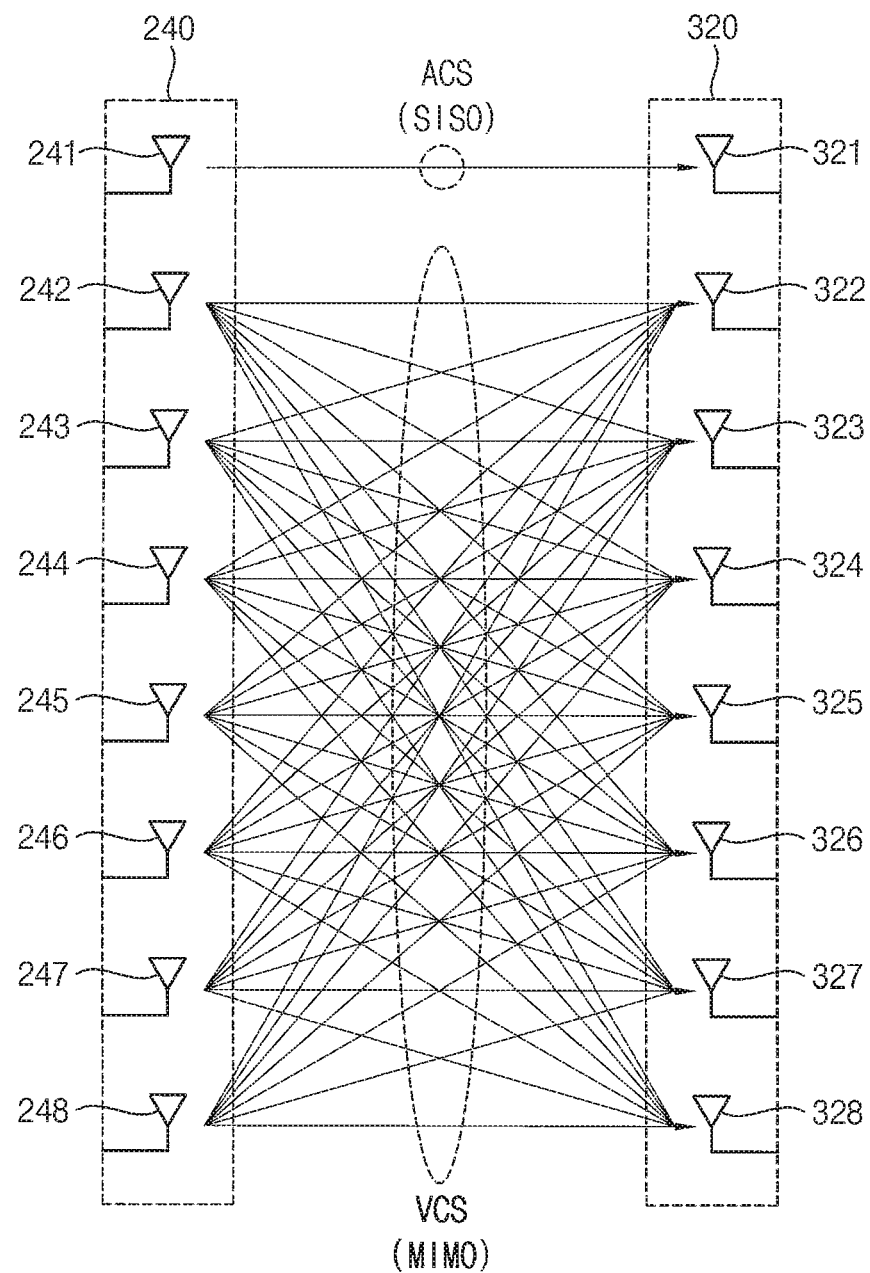
Figure 2D:
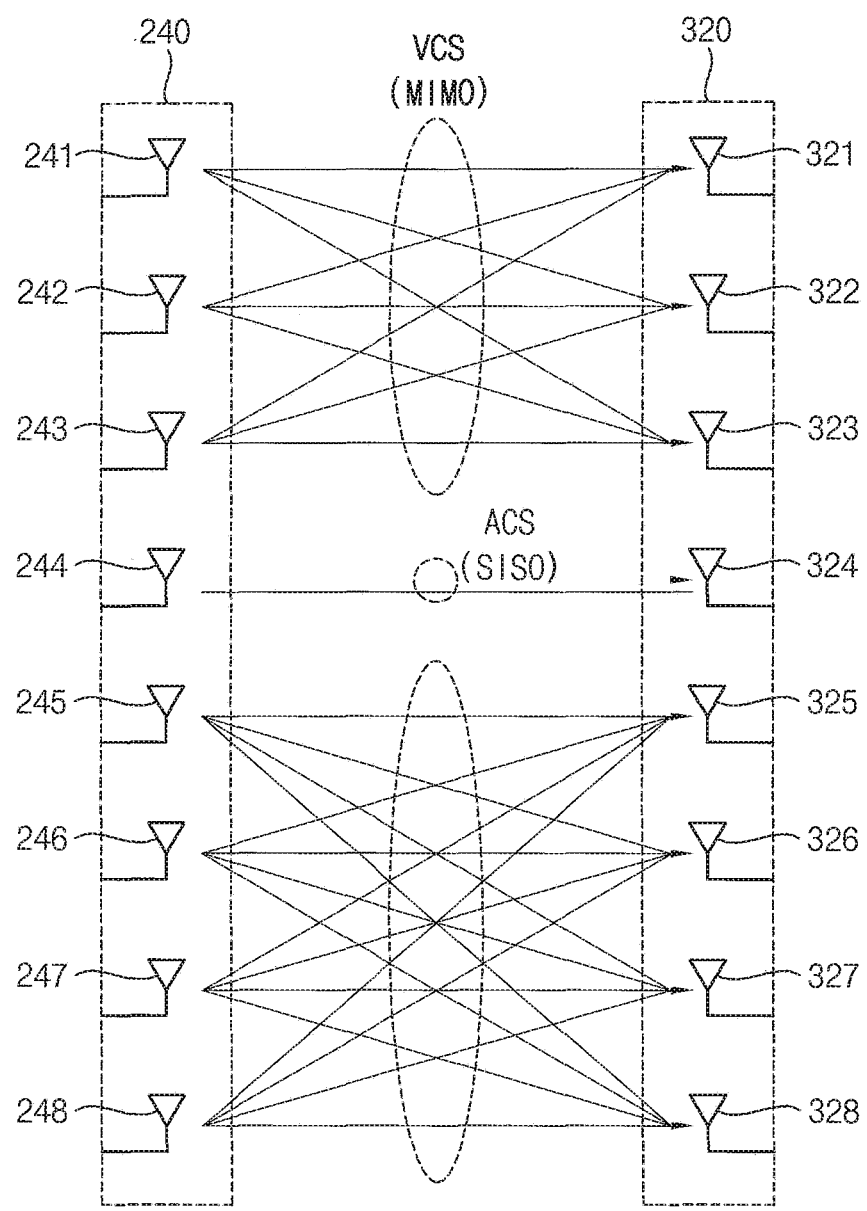

For example, as illustrated in FIGS. 2A through 2D, the base station 200 may include the first through eighth transmitting antennas 241 through 248, and the display device 300 may include the first through eighth receiving antennas 321 through 328. In a case where a communication channel between the eighth transmitting antenna 248 and the eighth receiving antenna 328 has the maximum fading value, as illustrated in FIG. 2A, the video communication signal VCS may be transferred through the 7*7 MIMO communication channels between the first through seventh transmitting antennas 241 through 247 of the base station 200 and the first through seventh receiving antennas 321 through 327 of the display device 300, and the audio communication signal ACS may be transferred through the SISO communication channel by the eighth transmitting antenna 248 of the base station 200 and the eighth receiving antenna 328 of the display device 300. Further, in a case where a communication channel between the first transmitting antenna 241 and the first receiving antenna 321 has the maximum fading value, as illustrated in FIG. 2B, the video communication signal VCS may be transferred through the 7*7 MIMO communication channels between the second through eighth transmitting antennas 242 through 248 of the base station 200 and the second through eighth receiving antennas 322 through 328 of the display device 300, and the audio communication signal ACS may be transferred through the SISO communication channel between the first transmitting antenna 241 of the base station 200 and the first receiving antenna 321 of the display device 300. Further, in a case where a communication channel between the fifth transmitting antenna 245 and the fifth receiving antenna 325 has the maximum fading value, as illustrated in FIG. 2C, the video communication signal VCS may be transferred through the 7*7 MIMO communication channels between the first through fourth and sixth through eighth transmitting antennas 241 through 244 and 246 through 248 of the base station 200 and the first through fourth and sixth through eighth receiving antennas 321 through 324 and 326 through 328 of the display device 300, and the audio communication signal ACS may be transferred through the SISO communication channel between the fifth transmitting antenna 245 of the base station 200 and the fifth receiving antenna 325 of the display device 300. Further, in a case where a communication channel between the fourth transmitting antenna 244 and the fourth receiving antenna 324 has the maximum fading value, as illustrated in FIG. 2D, the video communication signal VCS may be transferred through the 7*7 MIMO communication channels between the first through third and fifth through eighth transmitting antennas 241 through 243 and 245 through 248 of the base station 200 and the first through third and fifth through eighth receiving antennas 321 through 323 and 325 through 328 of the display device 300, and the audio communication signal ACS may be transferred through the SISO communication channel between the fourth transmitting antenna 244 of the base station 200 and the fourth receiving antenna 324 of the display device 300.

As described above, in a case where the communication channel having the maximum fading value is selected as the communication channel for transferring the audio communication signal ACS, the signal attenuation degree of the audio communication signal ACS in the selected communication channel that has the maximum fading value may be excessive. However, even if the signal attenuation degree of the audio communication signal ACS is excessive, the audio communication signal ACS may have the shorter latency than the video communication signal VCS, and thus the audio communication signal ACS can be transferred repeatedly. Further, the video communication signal VCS is transferred through the MIMO communication channels having relatively small fading values.

Referring back to FIG. 1, the base station 200 may further include a temporal-spatio code (TSC) encoder 220 and a transmitter 230 that are used to transmit the video communication signal VCS through the MIMO communication channels and to transmit the audio communication signal ACS through the SISO communication channel.

The TSC encoder 220 may receive original video data OVDAT and audio data ADAT from a data source 210. According to example embodiments, the data source 210 may be a memory included in the base station 200 or an external data source. The TSC encoder 220 may generate transmitted video data TVDAT (or video data to be transmitted to the display device 300) by performing TSC encoding on the original video data OVDAT. While the TSC encoder 220 may perform encoding on the original video data OVDAT, the TSC encoder 220 may not perform encoding on the audio data ADAT.

In some example embodiments, a temporal-spatio code (TSC) used in the TSC encoding may be, $$\begin{bmatrix} x1 & x2 & x3 & x4 & x5 & x6 & x7 \\ -x2 & x1 & x4 & -x3 & x6 & -x5 & 0 \\ -x3 & -x4 & x1 & x2 & x7 & 0 & -x5 \\ -x4 & x3 & -x2 & x1 & 0 & -x7 & x6 \\ -x5 & -x6 & -x7 & 0 & x1 & x2 & x3 \\ -x6 & x5 & 0 & x7 & -x2 & x1 & -x4 \\ -x7 & 0 & x5 & -x6 & -x3 & x4 & x1 \\ 0 & -x7 & x6 & x5 & -x4 & -x3 & x2 \\ x1^* & x2^* & x3^* & x4^* & x5^* & x6^* & x7^* \\ -x2^* & x1^* & x4^* & -x3^* & x6^* & -x5^* & 0 \\ -x3^* & -x4^* & x1^* & x2^* & x7^* & 0 & -x5^* \\ -x4^* & x3^* & -x2^* & x1^* & 0 & -x7^* & x6^* \\ -x5^* & -x6^* & -x7^* & 0 & x1^* & x2^* & x3^* \\ -x6^* & x5^* & 0 & x7^* & -x2^* & x1^* & -x4^* \\ -x7^* & 0 & x5^* & -x6^* & -x3^* & x4^* & x1^* \\ 0 & -x7^* & x6^* & x5^* & -x4^* & -x3^* & x2^* \end{bmatrix},$$

where data values x1 through x7 may be first through seventh data values included in the original video data OVDAT, and data values x1* through x7* may be conjugates of the data values x1 through x7.

That is, the TSC encoder 220 may generate and output the transmitted video data TVDAT by temporally and spatially modulating the original video data OVDAT using the temporal-spatio code. For example, as illustrated in FIG. 3, the TSC encoder 220 may temporally and spatially modulate the original video data OVDAT representing the data values x1 through x7 using the temporal-spatio code 400, and may output the transmitted video data TVDAT corresponding to the video communication signal VCS to be transmitted by the first through seventh transmitting antennas 241 through 247 during first through sixteenth unit times UT1 through UT16.

For example, as illustrated in FIG. 3, to output the transmitted video data TVDAT for the original video data OVDAT representing the data values x1 through x7, the TSC encoder 220 may parallelly output "x1", "x2", "x3", "x4", "x5" y37 , "x6", and "x7" in the first unit time UT1, may parallelly output "−x2", "x1", "x4", "−x3", "x6", "−x5", and "0" in the second unit time UT2, may parallelly output "−x3", "−x4", "x1", "x2", "x7", "0", and "−x5" in the third unit time UT3, may parallelly output "−x4", "x3", "−x2", "x1", "0", "−x7", and "x6" in the fourth unit time UT4, may parallelly output "−x5", "−x6", "−x7", "0", "x1", "x2", and "x3" in the fifth unit time UT5, may parallelly output "−x6", "x5", "0", "x7", "−x2", "x1", and "−x4" in the sixth unit time UT6, may parallelly output "−x7", "0", "x5", "−x6", "−x3", "x4", and "x1" in the seventh unit time UT7, and may parallelly output "0", "−x7", "x6", "x5", "−x4", "−x3", and "x2" in the eighth unit time UT8. Further, with respect to the original video data OVDAT representing the data values x1 through x7, the TSC encoder 220 may further output, in the ninth through sixteenth unit times UT9 through UT16, conjugates of the transmitted video data TVDAT output in the first through eighth unit times UT1 through UT8. Thus, to output the transmitted video data TVDAT, the TSC encoder 220 may parallelly output "x1*", "x2*", "x3*", "x4*", "x5*", "x6*", and "x7*" in the ninth unit time UT9, may parallelly output "−x2*", "x1*", "x4*", "−x3*", "x6*", "−x5*", and "0" in the tenth unit time UT10, may parallelly output "−x3*", "−x4*", "x1*", "x2*", "x7*", "0", and "−x5*" in the eleventh unit time UT11, may parallelly output "−x4*", "x3*", "−x2*", "x1*", "0", "−x7*", and "x6*" in the twelfth unit time UT12, may parallelly output "−x5*", "−x6*", "−x7*", "0", "x1*", "x2*", and "x3*" in the thirteen unit time UT13, may parallelly output "−x6*", "x5*", "0", "x7*", "−x2*", "x1*", and "−x4*" in the fourteenth unit time UT14, may parallelly output "−x7*", "0", "x5*", "−x6*", "−x3*", "x4*", and "x1*" in the fifteenth unit time UT15, and may parallelly output "0", "−x7*", "x6*", "x5*", "−x4*", "−x3*", and "x2*" in the sixteenth unit time UT16.

The transmitter 230 may receive the transmitted video data TVDAT generated from the TSC encoder 220, and may further receive the audio data ADAT from the TSC encoder 220. The audio data ADAT may not be encoded by the TSC encoder 220. The transmitter 230 may generate the video communication signal VCS by performing digital-to-analog conversion on the transmitted video data TVDAT, and transmit the video communication signal VCS using the N−1 transmitting antennas 241, . . . , 247. Further, the transmitter 230 may generate the audio communication signal ACS by performing digital-to-analog conversion on the audio data ADAT, and transmit the audio communication signal ACS using the transmitting antenna 248. In some example embodiments, the transmitter 230 may include N signal processing paths including N−1 signal processing paths for transmitting the video communication signal VCS and one signal processing path for transmitting the audio communication signal ACS. For example, each of the N signal processing paths may include, but are not limited to, a digital-to-analog converter (DAC) for performing the digital-to-analog conversion, a band select filter for eliminating an unnecessary frequency component, a frequency up-conversion mixer for up-converting a carrier frequency, and a power amplifier for amplifying a signal power.

The display device 300 may include the display panel 310, the N receiving antennas 320, a communication module 330, and a display driver 340 that are used to receive the video communication signal VCS through the MIMO communication channels and the audio communication signal ACS through the SISO communication channel.

The display panel 310 may include a plurality of data lines, a plurality of gate lines, and a plurality of pixels PX connected to the plurality of data lines and the plurality of gate lines. In some example embodiments, each pixel PX may include at least two transistors, at least one capacitor, and an organic light emitting diode (OLED), and the display panel 310 may be an OLED display panel. In other example embodiments, each pixel PX may include a switching transistor, and a liquid crystal capacitor connected to the switching transistor, and the display panel 310 may be a liquid crystal display (LCD) panel. However, the display panel 310 may not be limited to the LCD panel and the OLED panel, and may be any suitable display panel without deviating from the scope of the present disclosure.

The N receiving antennas 320 may be integrated with the display panel 310. Here, the N receiving antennas 320 being integrated with the display panel 310 may mean that the N receiving antennas 320 may be combined, included, formed, or embedded in the display panel 310 in various configurations and/or manners. In some example embodiments, the N receiving antennas 320 may include the eight receiving antennas 321, . . . , 327, and 328. In this case, among the eight receiving antennas 321, . . . , 327, and 328, the seven receiving antennas 321, . . . , 327 may be used for receiving the video communication signal VCS, and the receiving antenna 328 may be used for receiving the audio communication signal ACS.

The communication module 330 may receive the video communication signal VCS from the N−1 receiving antennas 321, . . . , 327 of the N receiving antennas 320 and the audio communication signal ACS from the receiving antenna 328 of the N receiving antennas 320, and generate the original video data OVDAT based on the video communication signal VCS and the audio data ADAT based on the audio communication signal ACS. To perform these operations, the communication module 330 may include a receiver and a TSC decoder. The receiver may receive the video communication signal VCS from the N−1 receiving antennas 321, . . . , 327 and generate the original video data OVDAT by performing analog-to-digital conversion on the video communication signal VCS. The receiver may also receive the audio communication signal ACS from the receiving antenna 328 and generate the audio data ADAT by performing analog-to-digital conversion on the audio communication signal ACS. The TSC decoder may generate the original video data OVDAT by performing TSC decoding on the video communication signal VCS.

The display driver 340 may receive the original video data OVDAT from the communication module 330, and drive the display panel 310 based on the original video data OVDAT. In some example embodiments, the display driver 340 may include, but not limited to, a data driver that provides data signals to the plurality of pixels PX based on the original video data OVDAT, a gate driver that provides gate signals to the plurality of pixels PX, and a controller that controls the data driver and the gate driver. Further, in some example embodiments, the display driver 340 may receive the audio data ADAT from the communication module 330, and provide the audio data ADAT to a speaker that may be disposed inside or outside the display device 300.

As described above, in the communication system 100, the video communication signal VCS may be transferred through the (N−1)*(N−1) MIMO communication channels, for example the 7*7 MIMO communication channels, and the audio communication signal ACS may be transferred through the SISO communication channel that is separate from the MIMO communication channels. Accordingly, the video communication signal VCS may be transferred at a data transfer rate (or a data transfer speed) higher than that of the audio communication signal ACS. Further, the base station 200 may transfer the audio communication signal ACS through the SISO communication without encoding the audio communication signal ACS, therefore the display device 300 does not have to decode the audio communication signal ACS. Thus, the audio communication signal ACS may be transferred with a latency that may be shorter than that of the video communication signal VCS. Therefore, the communication system 100 may perform the MIMO communication and the SISO communication respectively suitable for the video communication signal VCS and the audio communication signal ACS based on the latency. Further, in some example embodiments, the communication channel that has the maximum fading value or the maximum signal attenuation degree may be selected as the SISO communication channel for transferring the audio communication signal ACS. If necessary, the audio communication signal ACS can be re-transferred taking advantage of its shorter latency. The video communication signal VCS can be transferred through the MIMO communication channels that have the relatively small fading values among the established communication channels between the base station 200 and the display device 300.

Figure 4:
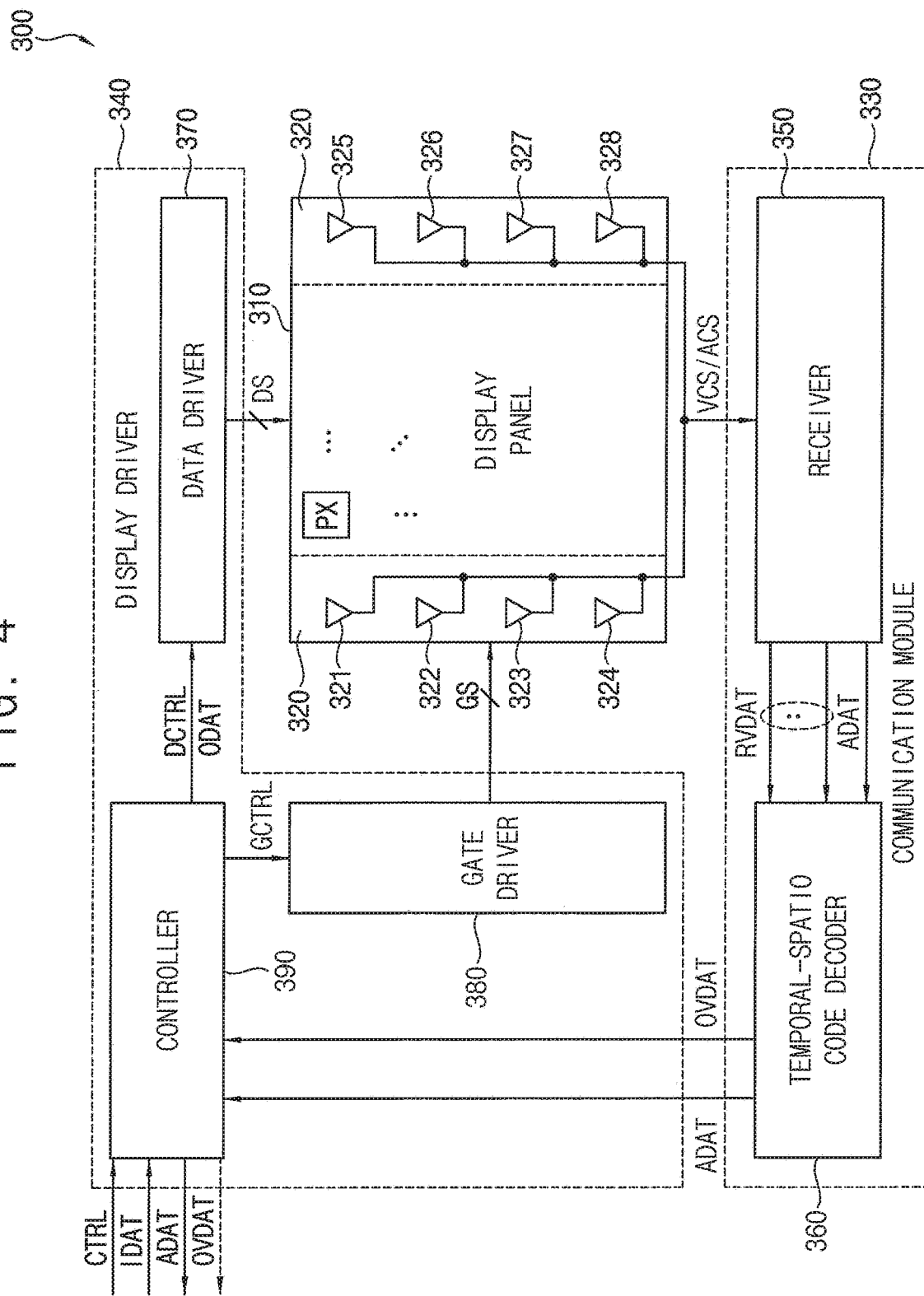
FIG. 4 is a block diagram illustrating a display device according to an example embodiment.
Figure 5:
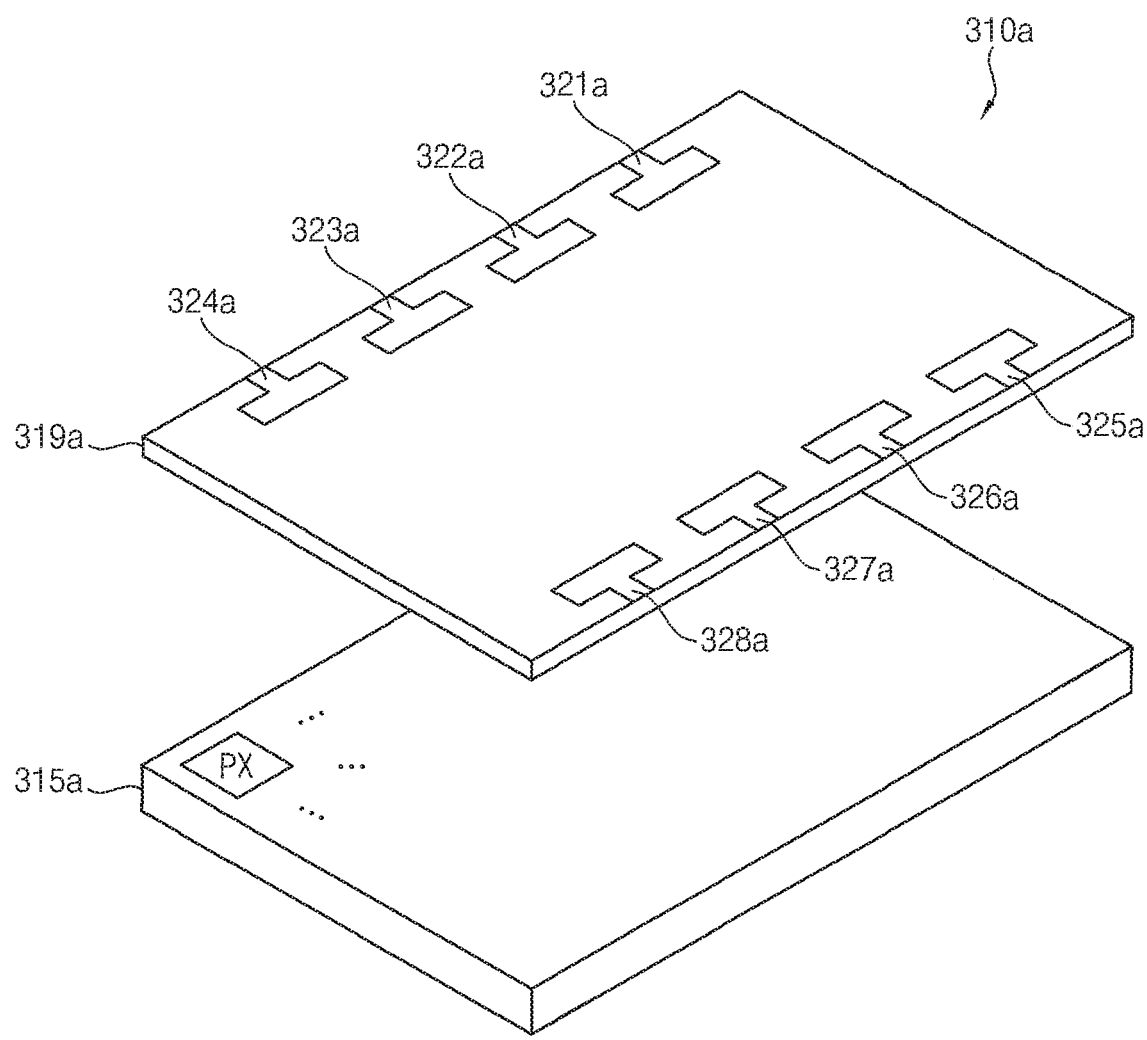
FIG. 5 is a diagram illustrating an example of a display panel in which a plurality of receiving antennas are integrated according to an example embodiment.
Figure 6:
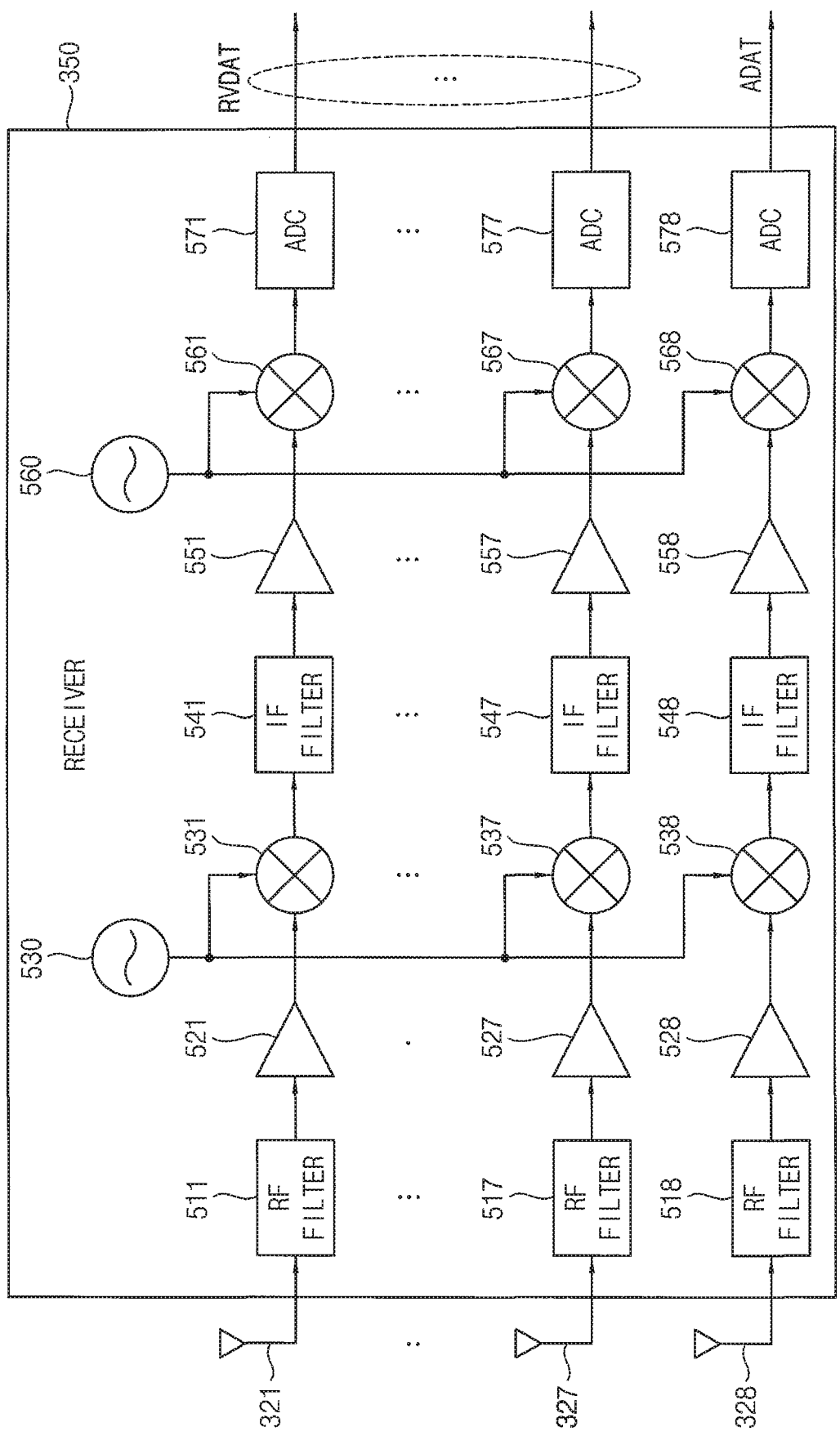
FIG. 6 is a diagram illustrating an example of a receiver included in a display device according to an example embodiment.
Figure 8:
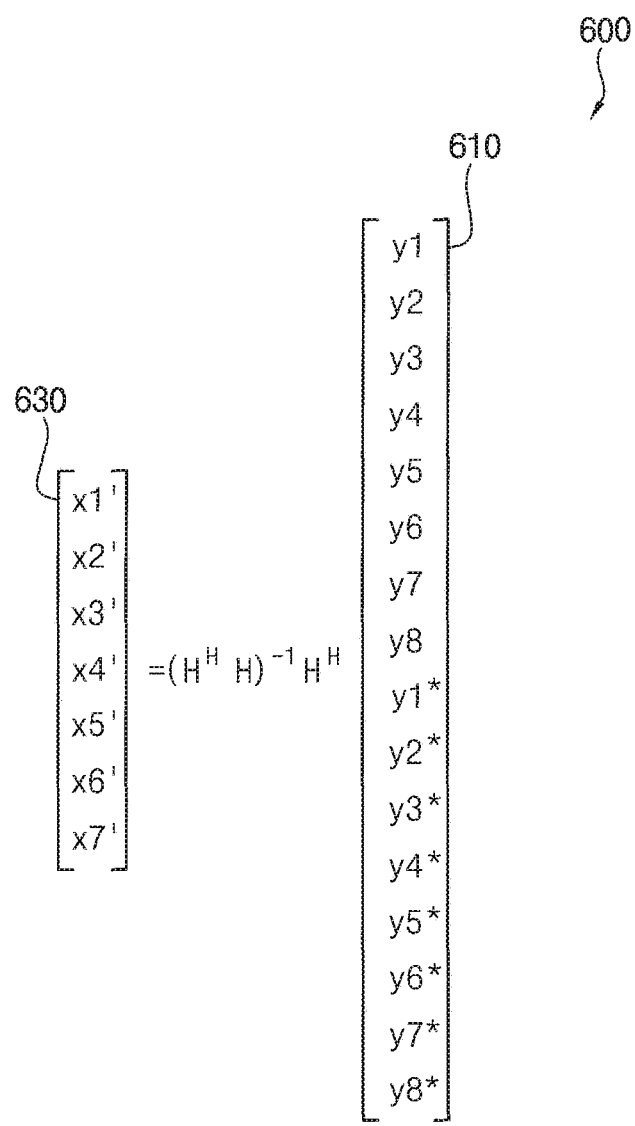
FIG. 8 is a diagram for describing an example of TSC decoding in a display device according to an example embodiment.

FIG. 4 is a block diagram illustrating a display device according to an example embodiment, FIG. 5 is a diagram illustrating an example of a display panel in which a plurality of receiving antennas are integrated according to an example embodiment, FIG. 6 is a diagram illustrating an example of a receiver included in a display device according to an example embodiment, FIG. 7 is a diagram for describing an example of a received video data matrix in a display device according to an example embodiment, and FIG. 8 is a diagram for describing an example of TSC decoding in a display device according to an example embodiment.

Referring to FIG. 4, the display device 300 may include the display panel 310, the N receiving antennas 320, the communication module 330, and the display driver 340. The communication module 330 may include a receiver 350 and a TSC decoder 360.

The display panel 310 may include a plurality of pixels PX. In some example embodiments, each pixel PX may include at least two transistors, at least one capacitor, and an organic light emitting diode (OLED), and the display panel 310 may be an OLED display panel. In other example embodiments, each pixel PX may include a switching transistor, and a liquid crystal capacitor connected to the switching transistor, and the display panel 310 may be a liquid crystal display (LCD) panel. However, the display panel 310 may not be limited to the LCD panel and the OLED panel, and may be any suitable display panel without deviating from the scope of the present disclosure.

The N receiving antennas 320 may be integrated with the display panel 310.

Referring to FIG. 5, a display panel 310a may include a transparent film 319a, eight receiving antennas 321a through 328a may be formed as transparent electrodes on the transparent film 319a. According to some embodiments, the transparent film 319a may be attached or coupled to a substrate (e.g., a polyimide (PI) substrate) in which the plurality of pixels PX are formed. However, it is noted that the display panel 310 in which the N receiving antennas 320 are integrated may not be limited to the display panel 310a illustrated in FIG. 5.

The receiver 350 may receive the video communication signal VCS that is received through multiple input multiple output (MIMO) communication channels using N−1 receiving antennas 321, . . . , 327 of the N receiving antennas 320 and the audio communication signal ACS that is received through single input single output (SISO) communication channel using the receiving antenna 328 of the N receiving antennas 320. In some example embodiments, the display device 300 may include, as the N receiving antennas 320, eight receiving antennas 321 through 328. In this case, the receiver 350 may receive the video communication signal VCS through 7*7 MIMO communication channels between seven receiving antennas 321 through 327 of the N receiving antennas 320 along with the corresponding seven transmitting antennas of the base station 200 and the audio communication signal ACS through the SISO communication channel between the receiving antenna 328 of the N receiving antennas 320 along with a corresponding transmitting antenna of the base station 200. Further, the receiver 350 may generate received video data RVDAT by performing analog-to-digital conversion on the video communication signal VCS and the audio data ADAT by performing analog-to-digital conversion on the audio communication signal ACS.

Referring to FIG. 6, the receiver 350 may include a plurality of radio frequency (RF) filters 511, ..., 517, and 518, a plurality of low noise amplifiers (LNAs) 521, ..., 527, and 528, a first local oscillator (LO) 530, a plurality of RF down mixers 531, ..., 537, and 538, a plurality of intermediate frequency (IF) filters 541, ..., 547, and 548, a plurality of IF amplifiers 551, ..., 557 and 558, a second LO 560, a plurality of IF down mixers 561, ..., 567, and 568, and a plurality of analog-to-digital converters (ADCs) 571, ..., 577, and 578.

The plurality of RF filters 511, ..., 517, and 518 may eliminate an unnecessary frequency component in RF band signals that are received through the N receiving antennas 320. The plurality of LNAs 521, ..., 527, and 528 may amplify the RF band signals that are filtered by and output from the plurality of RF filters 511, ..., 517, and 518. The plurality of RF down mixers 531, ..., 537, and 538 may convert the RF band signals that are amplified by the plurality of LNAs 521, ..., 527, and 528 into IF band signals using an oscillation signal generated by the first LO 530. The plurality of IF filters 541, ..., 547, and 548 may eliminate an unnecessary frequency component in the IF band signals. The plurality of IF amplifiers 551, ..., 557, and 558 may amplify the IF band signals that are output from the plurality of IF filters 541, ..., 547, and 548. The plurality of IF down mixers 561, ..., 567, and 568 may convert the IF band signals that are output from the plurality of IF amplifiers 551, ..., 557, and 558 into baseband signals using an oscillation signal generated by the second LO 560. The plurality of ADCs 571, ..., 577, and 578 may generate the received video data RVDAT and the audio data ADAT by performing the analog-to-digital conversion on the baseband signals that are output from the plurality of IF down mixers 561, ..., 567, and 568 corresponding to the video communication signal VCS and the audio communication signal ACS. Although FIG. 6 illustrates an example of the receiver 350, a configuration of the receiver 350 may not be limited to the example of FIG. 6.

The TSC decoder 360 may receive the received video data RVDAT and the audio data ADAT from the receiver 350. The TSC decoder 360 may merely bypass and output the audio data ADAT without performing decoding on the audio data ADAT. Further, the TSC decoder 360 may generate the original video data OVDAT by performing temporal-spatio code (TSC) decoding on the received video data RVDAT.

Referring to FIGS. 1 and 7, the transmitted video data TVDAT may be generated by performing TSC encoding on the original video data OVDAT representing the data values x1 through x7 using the TSC 400, and the transmitted video data TVDAT may be transmitted as the video communication signal VCS by the transmitter 230 of FIG. 1. Referring to FIG. 7, a matrix 440 representing the received video data RVDAT and received by the TSC decoder 360 during first through sixteenth unit times UT1 through UT16 may be substantially equal to a sum of a product of a channel matrix 420 and a matrix 410 representing the original video data OVDAT including the data values x1 through x7 and a noise matrix 430. The channel matrix 420 may represent channel coefficients of a plurality of communication channels between the first through seventh transmitting antennas 241 through 217 and the first through seventh receiving antennas 321 through 327 during the first through sixteenth unit times. Further, the noise matrix 430 may represents noised during the first through sixteenth unit times UT1 through UT16. In the example of FIG. 7, each of data values y1 through y8 of the matrix 440 representing the received video data RVDAT may be a sum of seven data values of the received video data RVDAT in each of the first through eighth unit times UT1 through UT8. For example, the data value y1 may represent the sum of the seven data values of the received video data RVDAT in the first unit time UT1, and the data value y8 may represent the sum of the seven data values of the received video data RVDAT in the eighth unit time UT8. Further, each of data values y1* through y8* of the data matrix 440 may be the sum of the seven data values of the received video data RVDAT in each of the ninth through sixteenth unit times UT9 through UT16. Since the transmitted video data TVDAT in the ninth through sixteenth unit times UT9 through UT16 are conjugates of the transmitted video data TVDAT in the first through eighth unit times UT1 through UT8, the data values y1* through y8*, or the received video data RVDAT in the ninth through sixteenth unit times UT9 through UT16 may be conjugates of the data values y1 through y8, or the received video data RVDAT in the first through eighth unit times UT1 through UT8. The data values x1 through x7 of the matrix 410 may represent first through seventh data values included in the original video data OVDAT in the base station 200. Further, n1 through n8 of the noise matrix 430 may represent noises of the MIMO communication channels in the first through eighth unit times UT1 through UT8, and n1* through n8* of the noise matrix 430 may represent noises of the plurality of MIMO communication channels in the ninth through sixteenth unit times UT9 through UT16. In some example embodiments, n1* through n8* representing the noises in the ninth through sixteenth unit times UT9 through UT16 may be conjugates of n1 through n8 representing the noises in the first through eighth unit times UT1 through UT8.

In some example embodiments, as illustrated in FIG. 7, the channel matrix 420 representing the channel coefficients during the first through sixteenth unit times UT1 through UT16 may be, $$\begin{bmatrix} h11 & h12 & h13 & h14 & h15 & h16 & h17 \\ h22 & -h21 & h24 & -h23 & -h26 & h25 & 0 \\ h33 & h34 & -h31 & -h32 & -h37 & 0 & h35 \\ h44 & -h43 & h42 & -h41 & 0 & h47 & -h46 \\ h55 & h56 & h57 & 0 & -h51 & -h52 & -h53 \\ h66 & -h65 & 0 & -h67 & h62 & -h61 & h64 \\ h77 & 0 & -h75 & h76 & h73 & -h74 & -h71 \\ 0 & h87 & -h86 & -h85 & h84 & h83 & -h82 \\ h11^* & h12^* & h13^* & h14^* & h15^* & h16^* & h17^* \\ h22^* & -h21^* & h24^* & -h23^* & -h26^* & h25^* & 0 \\ h33^* & h34^* & -h31^* & -h32^* & -h37^* & 0 & h35^* \\ h44^* & -h43^* & h42^* & -h41^* & 0 & h47^* & -h46^* \\ h55^* & h56^* & h57^* & 0 & -h51^* & -h52^* & -h53^* \\ h66^* & -h65^* & 0 & -h67^* & h62^* & -h61^* & h64^* \\ h77^* & 0 & -h75^* & h76^* & h73^* & -h74^* & -h71^* \\ 0 & h87^* & -h86^* & -h85^* & h84^* & h83^* & -h82^* \end{bmatrix},$$

where hij may be a channel coefficient for the video communication signal VCS transmitted by a j-th one of the seven transmitting antennas in an i-th unit time, hij* may be a conjugate of the hij, i may be an integer greater than or equal to 1 and smaller than or equal to 8, and j may be an integer greater than or equal to 1 and smaller than or equal to 7. For example, the video communication signal VCS corresponding to the original video data OVDAT representing the data values x1 through x7 may be transmitted through the first through seventh transmitting antennas during the first through sixteenth unit times UT1 through UT16, h11 may represent the channel coefficient for the video communication signal VCS transmitted by the first transmitting antenna in the first unit time UT1, and h87 may represent the channel coefficient for the video communication signal VCS transmitted by the seventh transmitting antenna in the eighth unit time UT8. Similarly, h11* may represent the channel coefficient for the video communication signal VCS transmitted by the first transmitting antenna in the ninth unit time UT9, and may be a conjugate of h11. Further, h87* may represent the channel coefficient for the video communication signal VCS transmitted by the seventh transmitting antenna in the sixteenth unit time UT16, and may be a conjugate of h87.

To extract the matrix 410 representing the original video data OVDAT from the matrix 440 representing the received video data RVDAT as illustrated in FIG. 7, the TSC decoder 360 may perform the TSC decoding on the received video data RVDAT using an equation, "$X=(H^H H)^{-1} H^H Y$". Here, X may correspond to an original video data matrix where at least a portion of noise components of the noise matrix 430 may be added to the matrix 410 as illustrated in FIG. 7. However, by the TSC decoding, the noise components may be ignored (or neglected) in the original video data matrix, or the matrix X, and thus the matrix X may be substantially the same as the matrix 410 representing the original video data OVDAT. Further, Y may correspond to the matrix 440 of FIG. 7 representing the received video data RVDAT, H may correspond to the channel matrix 420 of the MIMO communication channels illustrated in FIG. 7, and $H^H$ may be a Hermitian matrix of the channel matrix 420.

Referring to FIG. 8, an original video data matrix 630 representing the original video data OVDAT may be extracted by performing the TSC decoding on a received video data matrix 610 using an equation 600, or "$X=(H^H H)^{-1} H^H Y$". Although x1' through x7' of the original video data matrix 630 may be data values where the noise components are added to the data values x1 through x7 of the original video data in the base station 200, the noise components may be of a negligible level.

The TSC decoder 360 may provide the display driver 340 with the original video data OVDAT generated by performing the TSC decoding and the audio data ADAT on which no decoding may be performed. The display driver 340 may drive the display panel 310 based on the original video data OVDAT. Further, the display driver 340 may provide the audio data ADAT to a speaker that may be disposed inside or outside the display device 300. Referring to FIG. 4, the display driver 340 may include a data driver 370, a gate driver 380, and a controller 390.

The data driver 370 may receive output image data ODAT and a data control signal DCTRL from the controller 390, generate data signals DS based on the data control signal DCTRL, and provide the data signals DS to the plurality of pixels PX through a plurality of data lines. In some example embodiments, the data control signal DCTRL may include, but is not limited to, an output data enable signal, a horizontal start signal, and a load signal. In some example embodiments, the data driver 370 and the controller 390 may be implemented as a single integrated circuit (IC), and the single integrated circuit may be referred to as a timing controller embedded data driver. In other example embodiments, the data driver 370 and the controller 390 may be implemented with separate integrated circuits.

The gate driver 380 may receive a gate control signal GCTRL from the controller 390, generate gate signals GS based on the gate control signal GCTRL, and provide the gate signals GS to the plurality of pixels PX through a plurality of gate lines. In some example embodiments, the gate driver 380 may sequentially provide the gate signals GS to the plurality of pixels PX on a row-by-row basis. Further, in some example embodiments, the gate control signal GCTRL may include, but is not limited to, a start signal, and a gate clock signal. In some example embodiments, the gate driver 380 may be integrated or formed in a peripheral portion of the display panel 310. In other example embodiments, the gate driver 380 may be implemented with one or more integrated circuits.

The controller 390 (e.g., a timing controller (TCON)) may receive the original video data OVDAT from the TSC decoder 360. In some example embodiments, the controller 390 may generate the output image data ODAT based on the original video data OVDAT received from the TSC decoder 360 and provide the output image data ODAT to the data driver 370. In other example embodiments, the controller 390 may provide the original video data OVDAT received from the TSC decoder 360 to an external host processor (e.g., a graphic processing unit (GPU) or a graphic card), receive input video data IDAT generated based on the original video data OVDAT from the host processor, and generate the output image data ODAT provided to the data driver 370 based on the input video data IDAT received from the external host processor. In some example embodiments, the controller 390 may further receive a control signal CTRL from the host processor, and the control signal CTRL may include, but is not limited to, a vertical synchronization signal, a horizontal synchronization signal, an input data enable signal, and a master clock signal. Further, the controller 390 may provide the audio data ADAT received from the TSC decoder 360 to the host processor or a speaker (not shown). The controller 390 may control the data driver 370 by providing the output image data ODAT and the data control signal DCTRL to the data driver 370, and may control the gate driver 380 by providing the gate control signal GCTRL to the gate driver 380.

As described above, the display device 300 may receive the video communication signal VCS through (N−1)*(N−1) MIMO communication channels, for example 7*7 MIMO communication channels using the N−1 receiving antennas 321 through 327 and the audio communication signal ACS through the SISO communication channel using the receiving antenna 328. Accordingly, the video communication signal VCS may be transferred at a data transfer rate (or a data transfer speed) higher than that of the audio communication signal ACS. Further, the audio communication signal ACS may be transferred through the SISO communication channel without encoding and decoding, and thus the audio communication signal ACS may be transferred with a latency shorter than that of the video communication signal VCS.

Figure 9:
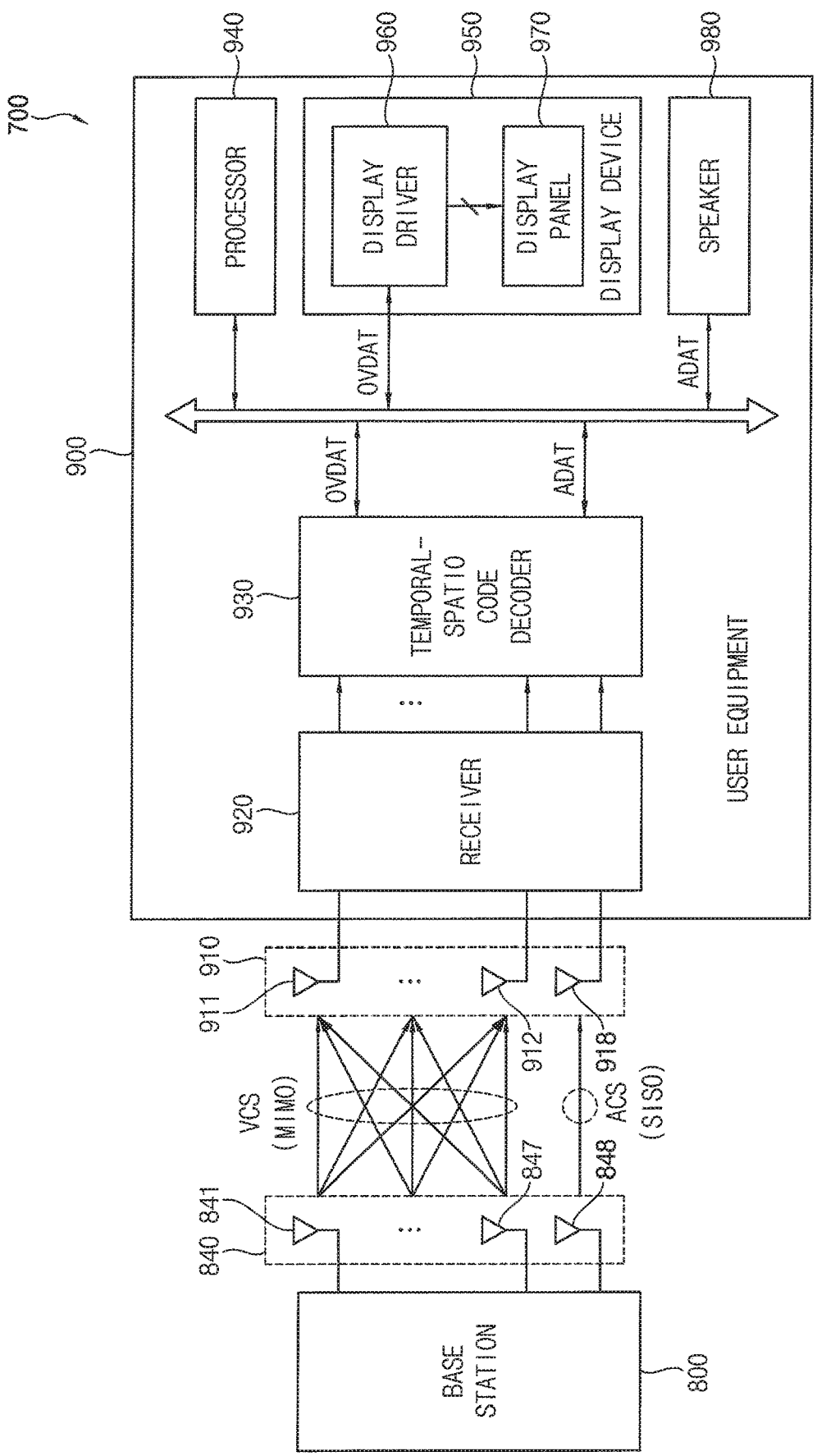
FIG. 9 is a block diagram illustrating a communication system according to an example embodiment.

FIG. 9 is a block diagram illustrating a communication system according to an example embodiment.

Referring to FIG. 9, a communication system 700 may include a base station 800 including N transmitting antennas 840 and a user equipment 900 including N receiving antennas 910. In some example embodiments, the user equipment 900 may be any electronic device including a display device 950. For example, the user equipment 900 may be, but is not limited to, a mobile phone, a cellular phone, a smart phone, a tablet computer, a wearable device, a digital television, a three-dimensional (3D) television, a personal computer (PC), a home appliance, a laptop computer, a personal digital assistant (PDA), a portable multimedia player (PMP), a digital camera, a music player, a portable game console, and a navigation system.

The base station 800 may generate the transmitted video data TVDAT by performing TSC encoding on the original video data OVDAT using the temporal-spatio code 400 illustrated in FIG. 3. The base station 800 may generate the video communication signal VCS by performing digital-to-analog conversion on the transmitted video data TVDAT and the audio communication signal ACS by performing digital-to-analog conversion on the audio data ADAT. Further, the base station 800 may transmit the video communication signal VCS using N−1 transmitting antennas 841, . . . , 847 of the N transmitting antennas 840 and transmit the audio communication signal ACS using a transmitting antenna 848 of the N transmitting antennas 840. In some example embodiments, as illustrated in FIGS. 2A through 2D, a communication channel having the maximum fading value among a plurality of communication channels may be selected as a communication channel for transferring the audio communication signal ACS.

The user equipment 900 may include the N receiving antennas 910, a receiver 920, a TSC decoder 930, a processor 940 that may be a central processing unit (CPU) of the user equipment 900, the display device 950 that displays an image based on original video data OVDAT, and a speaker 980 that outputs sound based on the audio data ADAT.

In some example embodiments, the N receiving antennas 910 may be integrated with a display panel 970 of the display device 950 in a manner similar to the example embodiment illustrated in FIG. 5. In other example embodiments, the N receiving antennas 910 may be disposed outside the display device 950 that has the display panel 970. For example, the display device 950 may be a smart phone, and the N receiving antennas 910 may be formed in a cover of the smart phone. However, the placement location of the N receiving antennas 910 may not be limited to the cover of the smart phone.

The receiver 920 may receive the video communication signal VCS through MIMO communication channels using N−1 receiving antennas 911, . . . , 917 of the N receiving antennas 910 and the audio communication signal ACS through SISO communication channel using a receiving antenna 918 of the N receiving antennas 910. Further, the receiver 920 may generate the received video data RVDAT by performing analog-to-digital conversion on the video communication signal VCS and the audio data ADAT by performing analog-to-digital conversion on the audio communication signal ACS.

The TSC decoder 930 may receive the received video data RVDAT and the audio data ADAT from the receiver 920. The TSC decoder 930 may output the audio data ADAT without decoding. The audio data ADAT output by the TSC decoder 930 may be provided to the speaker 980 via the processor 940, or may be provided directly to the speaker 980. The speaker 980 may output sound based on the audio data ADAT.

The TSC decoder 930 may generate the original video data OVDAT by performing TSC decoding on the received video data RVDAT. In some example embodiments, the TSC decoder 930 may perform the TSC decoding corresponding to the equation 600 illustrated in FIG. 8 on the received video data RVDAT. The original video data OVDAT output by the TSC decoder 930 may be provided to the display device 950 via the processor 950, or may be provided directly to the display device 950.

The display device 950 may include the display panel 970 including a plurality of pixels PX, and a display driver 960 that drives the display panel 970 based on the original video data OVDAT received from the TSC decoder 930 or the processor 950. In some example embodiments, the display driver 960 may include, but is not limited to, a data driver (e.g., the data driver 370 of FIG. 4) that provides data signals to the plurality of pixels PX based on the original video data OVDAT, a gate driver (e.g., the gate driver 380 of FIG. 4) that provides gate signals to the plurality of pixels PX, and a controller (e.g., the controller 390 of FIG. 4) that controls the data driver and the gate driver.

As described above, in the communication system 700, the video communication signal VCS may be transferred through the MIMO communication channels, and the audio communication signal ACS may be transferred through the SISO communication channel. Accordingly, the video communication signal VCS may be transferred at a data transfer rate (or a data transfer speed) higher than that of the audio communication signal ACS. Further, the audio communication signal ACS may be transferred through the SISO communication channel without encoding and decoding, and thus the audio communication signal ACS may be transferred with a latency shorter than that of the video communication signal VCS. Therefore, the communication system 700 may perform the MIMO communication and the SISO communication respectively suitable for the video communication signal VCS and the audio communication signal ACS.

The foregoing is illustrative of example embodiments of the present disclosure and is not to be construed as limiting thereof. Although some example embodiments have been described as non-limiting examples, those skilled in the art will readily appreciate that modifications are possible in the example embodiments without materially departing from the novel teachings and advantages of the present inventive concept. Accordingly, such modifications are intended to be included within the scope of the present inventive concept. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the present inventive concept.

What is claimed is:

1. A display device comprising:
    a display panel;
    N receiving antennas integrated with the display panel, where N is an integer greater than 2;
    a communication module that receives a video communication signal using a subset of receiving antennas of the N receiving antennas and an audio communication signal using at least one receiving antenna of the N receiving antennas that is different from the subset of receiving antennas and generates original video data based on the video communication signal and audio data based on the audio communication signal; and
    a display driver that receives the original video data from the communication module and drives the display panel based on the original video data,
    wherein the communication module receives the video communication signal by performing (N−1)*(N−1)

multiple input multiple output (MIMO) communication using (N−1) of the N receiving antennas, and wherein the communication module receives the audio communication signal by performing single input single output (SISO) communication using a remaining one of the N receiving antennas.

2. The display device of claim 1, wherein the communication module generates the original video data by performing temporal-spatio code (TSC) decoding on received video data corresponding to the video communication signal that is received using the subset of receiving antennas.

3. The display device of claim 2, wherein the communication module performs the TSC decoding on the received video data using an equation, "X=$(H^H H)^{-1} H^H Y$", where X is an original video data matrix representing the original video data, Y is a received video data matrix representing the received video data, H is a channel matrix of the video communication signal, and HH is a Hermitian matrix of the channel matrix.

4. The display device of claim 3, wherein the video communication signal is transmitted by seven transmitting antennas of a base station, and wherein the channel matrix is, $$\begin{bmatrix} h11 & h12 & h13 & h14 & h15 & h16 & h17 \\ h22 & -h21 & h24 & -h23 & -h26 & h25 & 0 \\ h33 & h34 & -h31 & -h32 & -h37 & 0 & h35 \\ h44 & -h43 & h42 & -h41 & 0 & h47 & -h46 \\ h55 & h56 & h57 & 0 & -h51 & -h52 & -h53 \\ h66 & -h65 & 0 & -h67 & h62 & -h61 & h64 \\ h77 & 0 & -h75 & h76 & h73 & -h74 & -h71 \\ 0 & h87 & -h86 & -h85 & h84 & h83 & -h82 \\ h11^* & h12^* & h13^* & h14^* & h15^* & h16^* & h17^* \\ h22^* & -h21^* & h24^* & -h23^* & -h26^* & h25^* & 0 \\ h33^* & h34^* & -h31^* & -h32^* & -h37^* & 0 & h35^* \\ h44^* & -h43^* & h42^* & -h41^* & 0 & h47^* & -h46^* \\ h55^* & h56^* & h57^* & 0 & -h51^* & -h52^* & -h53^* \\ h66^* & -h65^* & 0 & -h67^* & h62^* & -h61^* & h64^* \\ h77^* & 0 & -h75^* & h76^* & h73^* & -h74^* & -h71^* \\ 0 & h87^* & -h86^* & -h85^* & h84^* & h83^* & -h82^* \end{bmatrix},$$

where hij is a channel coefficient for the video communication signal transmitted by a j-th one of the seven transmitting antennas in an i-th unit time, hij* is a conjugate of the hij, i is an integer greater than or equal to 1 and smaller than or equal to 8, and j is an integer greater than or equal to 1 and smaller than or equal to 7.

5. The display device of claim 1, wherein the at least one receiving antenna for receiving the audio communication signal is selected from the N receiving antennas based on fading values of a plurality of communication channels corresponding to the N receiving antennas.

6. The display device of claim 5, wherein the at least one receiving antenna for receiving the audio communication signal is selected such that a communication channel corresponding to the at least one receiving antenna among the plurality of communication channels has a maximum fading value among the fading values.

7. The display device of claim 1, wherein the communication module includes:

a receiver that receives the video communication signal using the subset of receiving antennas and the audio communication signal using the at least one receiving antenna, and generates received video data by performing analog-to-digital conversion on the video communication signal and the audio data by performing analog-to-digital conversion on the audio communication signal; and a TSC decoder that generates the original video data by performing TSC decoding on the received video data.

8. The display device of claim 7, wherein the audio data are provided to a speaker through the display driver.

9. The display device of claim 1, wherein the display driver includes:

a data driver that provides data signals to a plurality of pixels based on the original video data;

a gate driver that provides gate signals to the plurality of pixels; and a controller that controls the data driver and the gate driver.

10. A communication device comprising:

a base station including N transmitting antennas, where N is an integer greater than 2, wherein the base station transmits a video communication signal using a subset of transmitting antennas of the N transmitting antennas and an audio communication signal using at least one transmitting antenna of the N transmitting antennas; and a user equipment including N receiving antennas and a display panel, wherein the user equipment receives the video communication signal using a subset of receiving antennas of the N receiving antennas and the audio communication signal using at least one receiving antenna of the N receiving antennas, and drives the display panel based on the video communication signal, wherein the video communication signal is transferred through (N−1)*(N−1) multiple input multiple output (MIMO) communication channels between (N−1) of the N transmitting antennas and (N−1) of the N receiving antennas, and wherein the audio communication signal is transferred through a single input single output (SISO) communication channel between a remaining one of the N transmitting antennas and a remaining one of the N receiving antennas.

11. The communication device of claim 10, wherein the N receiving antennas are integrated with the display panel.

12. The communication device of claim 10, wherein the user equipment further includes a display device having the display panel, and wherein the N receiving antennas are disposed outside the display device.

13. The communication device of claim 10, wherein the base station further includes:

a temporal-spatio code (TSC) encoder that generates transmitted video data by performing TSC encoding on original video data; and a transmitter that generates the video communication signal by performing digital-to-analog conversion on the transmitted video data and the audio communication signal by performing digital-to-analog conversion on audio data, and transmits the video communication signal using the subset of transmitting antennas, and the audio communication signal using the at least one transmitting antenna.

14. The communication device of claim 13, wherein a TSC used in the TSC encoding is, $$\begin{bmatrix} x1 & x2 & x3 & x4 & x5 & x6 & x7 \\ -x2 & x1 & x4 & -x3 & x6 & -x5 & 0 \\ -x3 & -x4 & x1 & x2 & x7 & 0 & -x5 \\ -x4 & x3 & -x2 & x1 & 0 & -x7 & x6 \\ -x5 & -x6 & -x7 & 0 & x1 & x2 & x3 \\ -x6 & x5 & 0 & x7 & -x2 & x1 & -x4 \\ -x7 & 0 & x5 & -x6 & -x3 & x4 & x1 \\ 0 & -x7 & x6 & x5 & -x4 & -x3 & x2 \\ x1^* & x2^* & x3^* & x4^* & x5^* & x6^* & x7^* \\ -x2^* & x1^* & x4^* & -x3^* & x6^* & -x5^* & 0 \\ -x3^* & -x4^* & x1^* & x2^* & x7^* & 0 & -x5^* \\ -x4^* & x3^* & -x2^* & x1^* & 0 & -x7^* & x6^* \\ -x5^* & -x6^* & -x7^* & 0 & x1^* & x2^* & x3^* \\ -x6^* & x5^* & 0 & x7^* & -x2^* & x1^* & -x4^* \\ -x7^* & 0 & x5^* & -x6^* & -x3^* & x4^* & x1^* \\ 0 & -x7^* & x6^* & x5^* & -x4^* & -x3^* & x2^* \end{bmatrix},$$

where data values x1 through x7 are first through seventh data values included in the original video data, and data values x1* through x7* are conjugates of the data values x1 through x7.

15. The communication device of claim 10, wherein the user equipment further includes:
 a receiver that receives the video communication signal using the subset of receiving antennas and the audio communication signal using the at least one receiving antenna, and generates received video data by performing analog-to-digital conversion on the video communication signal and audio data by performing analog-to-digital conversion on the audio communication signal; and
 a TSC decoder that generates original video data by performing TSC decoding on the received video data.

16. The communication device of claim 15, wherein the TSC decoder performs the TSC decoding on the received video data using an equation, "$X=(H^H H)^{-1} H^H Y$",
 where X is an original video data matrix representing the original video data, Y is a received video data matrix representing the received video data, H is a channel matrix of the video communication signal, and HH is a Hermitian matrix of the channel matrix.

17. The communication device of claim 16, wherein the video communication signal is transmitted by seven transmitting antennas of the base station, and
 wherein the channel matrix is, $$\begin{bmatrix} h11 & h12 & h13 & h14 & h15 & h16 & h17 \\ h22 & -h21 & h24 & -h23 & -h26 & h25 & 0 \\ h33 & h34 & -h31 & -h32 & -h37 & 0 & h35 \\ h44 & -h43 & h42 & -h41 & 0 & h47 & -h46 \\ h55 & h56 & h57 & 0 & -h51 & -h52 & -h53 \\ h66 & -h65 & 0 & -h67 & h62 & -h61 & h64 \\ h77 & 0 & -h75 & h76 & h73 & -h74 & -h71 \\ 0 & h87 & -h86 & -h85 & h84 & h83 & -h82 \\ h11^* & h12^* & h13^* & h14^* & h15^* & h16^* & h17^* \\ h22^* & -h21^* & h24^* & -h23^* & -h26^* & h25^* & 0 \\ h33^* & h34^* & -h31^* & -h32^* & -h37^* & 0 & h35^* \\ h44^* & -h43^* & h42^* & -h41^* & 0 & h47^* & -h46^* \\ h55^* & h56^* & h57^* & 0 & -h51^* & -h52^* & -h53^* \\ h66^* & -h65^* & 0 & -h67^* & h62^* & -h61^* & h64^* \\ h77^* & 0 & -h75^* & h76^* & h73^* & -h74^* & -h71^* \\ 0 & h87^* & -h86^* & -h85^* & h84^* & h83^* & -h82^* \end{bmatrix},$$

where hij is a channel coefficient for the video communication signal transmitted by a j-th one of the seven transmitting antennas in an i-th unit time, hij* is a conjugate of the hij, i is an integer greater than or equal to 1 and smaller than or equal to 8, and j is an integer greater than or equal to 1 and smaller than or equal to 7.

18. The communication device of claim 10, wherein the at least one transmitting antenna for transmitting the audio communication signal is selected from the N transmitting antennas based on fading values of a plurality of communication channels corresponding to the N transmitting antennas, and
 the at least one receiving antenna is coupled to the transmitting antenna that is selected from the N receiving antennas.

* * * * *